Jan. 2, 1962  R. L. DILLS  3,015,712
OVEN THERMOSTAT BULB PROTECTOR
Filed June 10, 1960
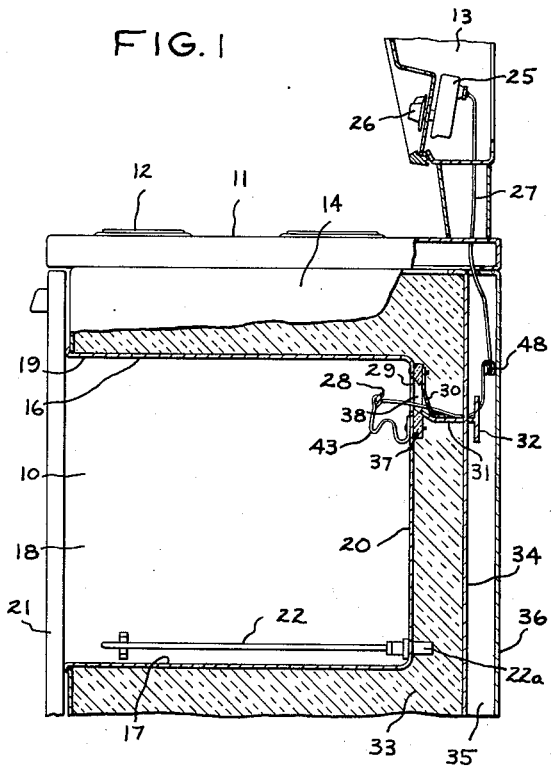
FIG. 1
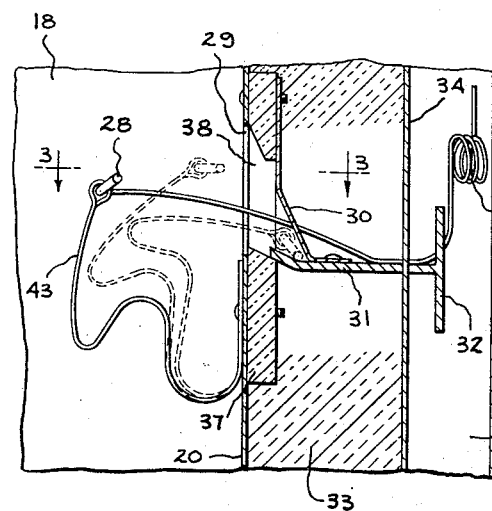
FIG. 2
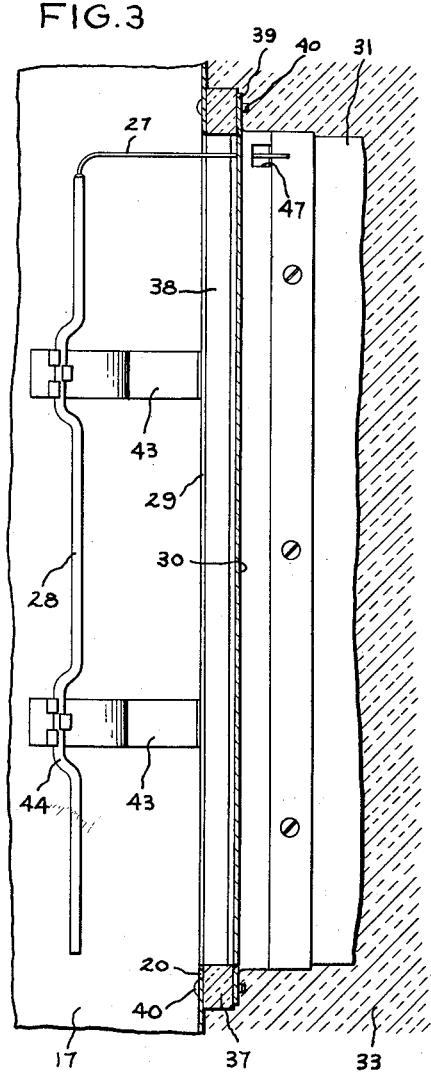
FIG. 3
FIG. 4
INVENTOR
RAYMOND L. DILLS
BY Richard L. Caslin
HIS ATTORNEY

United States Patent Office 3,015,712
Patented Jan. 2, 1962

3,015,712
OVEN THERMOSTAT BULB PROTECTOR
Raymond L. Dills, Louisville, Ky., assignor to General Electric Company, a corporation of New York
Filed June 10, 1960, Ser. No. 35,289
8 Claims. (Cl. 219—35)

The present invention relates to range ovens for domestic use and particularly to a means of protecting a hydraulic thermostat in a domestic oven where the temperatures rise appreciably above 600° F.

Hydraulic thermostats having a bulb formed on the end of a capillary tube that is joined to a bellows or diaphragm of a thermostat have been widely used as oven thermostats for many years. The maximum oven cooking temperatures have been in the vicinity of about 550° F., and the thermally responsive fluid used in the hydraulic control system has been able to withstand this amount of temperature without difficulty, but the known thermally responsive fluids cannot be operated at temperatures much above this value.

This invention contemplates the provision of a protective arrangement for the thermally responsive fluid so that a thermostat of the hydraulic type may be used successfully as a control element in the oven described and claimed in the co-pending application of Bohdan Hurko, Serial Number 27,926, filed May 9, 1960, which application is assigned to the General Electric Company, the assignee of this application; as there described and claimed the oven is provided with an automatic cleaning cycle where the temperature of the oven is raised to a heat cleaning temperature within the range between 750° F. and 950° F. so as to burn off all food soil and leave the walls of the oven cavity perfectly clean.

The principal object of the present invention is to design a protective means for the fluid of a hydraulic thermostat so that the thermostat may operate in a temperature range as high as 950° F. without failure.

Another object of this invention is to provide cooling means for the temperature responsive part, for example the bulb, of a hydraulic thermostat operative to cool the bulb when there is an abnormally high temperature in the oven.

A still further object of the present invention is to provide thermally responsive means for supporting the thermostat bulb so that the bulb is automatically moved into cooling relation with the cooling means, which in one form of the invention is a zone removed from the oven cavity, when the temperature of the oven is raised to the high cleaning temperatures.

The present invention is incorporated in an oven which has heating means capable of and controllable to elevate the oven temperature to a level materially in excess of 600° F. in accordance with the disclosure of the aforementioned copending application of Bohdan Hurko. For controlling the heating means a hydraulic thermostat is provided having a bulb filled with a thermally responsive liquid and arranged to be placed in a heat sensitive position in the oven. Cooling means for the bulb are provided but are operative to perform the cooling function only when the bulb would be exposed to an excessively high temperature. Means are provided for moving the bulb into cooling relation with the cooling means when the oven temperature rises above a predetermined value, and for this purpose I provide means for effecting this movement of the bulb in response to the operation of a temperature sensitive element, as for example a bimetallic thermostatic member. In one form of this invention the cooling means includes a chamber outside of the oven into which the bulb is moved at the critical temperature.

My invention will be better understood from the following description taken in connection with the accompanying drawing and its scope will be pointed out in the appended claims.

FIGURE 1 is a right side elevational view of a free-standing range partly in cross-section showing one embodiment of the present invention;

FIGURE 2 is an enlarged fragmentary view of the disappearing thermostat bulb and the protective housing of FIGURE 1 for limiting the maximum temperature of the bulb;

FIGURE 3 is a top plan fragmentary view partly in cross-section taken on the line 3—3 of FIGURE 2; and FIGURE 4 is an elevation view of a control knob used with the thermal control of this invention.

Referring in detail to the drawing and in particular to FIGURE 1, this invention has been shown in one form as applied to an oven 10 embodied in a free-standing electric range. Of course, it will be understood that the oven could be heated by gas and it could just as well be a built-in wall oven or a countertop-mounted oven. The free-standing range shown has a cooktop 11 with a plurality of surface heating units 12 and a backsplasher 13 raised above the cooktop and extending along the back edge thereof. Conventionally the backsplasher includes the many surface unit and oven controls as well as timers, thermostats, and fluorescent lights for lighting up the controls as well as the work surfaces. Also, a free-standing range has a cabinet or range body 14 which encloses the oven 10 and serves to support the cooktop 11.

The range oven 10 has a cavity that is formed by an oven liner 16 having a bottom wall 17, parallel side walls 18, a top wall 19, and a back wall 20, while the open front of the oven cavity is closed by an oven door 21 that is usually hinged along the bottom edge for opening downwardly and outwardly. A lower bake heating unit 22 which is generally of loop-shape is supported from the bottom wall 17 of the oven liner and plugged into a connector 22a in the back wall 20. A standard electric oven also includes a broil heating unit supported adjacent the top wall of the oven liner. This broil unit is not shown for the purpose of simplicity as it does not represent part of the present invention.

The subject oven is not a standard oven as it is controlled and heated in such a manner that the temperature in the oven cavity may rise above the maximum cooking temperature of about 550° F. to a maximum heat cleaning temperature in the vicinity of 950° F. so that all food soil and grease spatterings covering the walls of the oven cavity will be burned off, and no hand scrubbing of the oven walls will be necessary to obtain clean oven surfaces—as contemplated by the aforementioned copending application of Hurko. The conventional hydraulic thermostat could not be used in such a high temperature oven, because the fluid used, even a high temperature fluid, such as phenyl di-phenyl chloride, will not withstand a temperature above about 600° F. before it starts to chemically decompose and lose its important properties.

For the purpose of controlling the heating unit 22 there is provided a thermostat 25 mounted within the backsplasher 13. This thermostat may be of any suitable hydraulic type, but I prefer to use a thermostat of the general type disclosed in the United States patent to W. J. Ettinger No. 2,260,014, dated October 21, 1941. As there described, this thermostat is provided with switch contacts (not shown here) but which will be located in the thermostat 25 at the backsplasher and connected in the energizing circuit of the heater 22 so that when the contacts are closed the heater is energized to heat the oven and when opened the heater is de-energized. It will be further understood and as described in the Ettinger patent when the thermally responsive fluid, which has a part of its system exposed to the oven temperature, expands to a set point the contacts will be opened by an associated diaphragm or bellows (not shown) and that they will be reclosed responsively to the contraction of the liquid as the oven cools. The thermostat includes a control knob 26 fitted on a shaft thereof so that the thermostat may be manually adjusted to obtain various temperature settings for obtaining various bake temperatures within a bake range running to a maximum of about 550° F.; this thermostat in accordance with this invention, however, in addition to the normal bake temperature range provided in Ettinger patent has an abnormally high cleaning temperature setting corresponding to an oven temperature in the range of 750° F. to 950° F. Preferably the control knob 26 will be provided with suitable indicia as shown in FIG. 4 to assist in setting the thermostat. A capillary tube 27 extends from the thermostat bellows or diaphragm (not shown) down the back side of the range body for connection with the thermostat bulb 28 which is horizontally arranged adjacent the back wall 20 of the oven liner near the top thereof so as to take up as little room as possible. An elongated slot 29 is formed in the back wall 20 of the oven liner so that the thermostat bulb 28 may move bodily therethrough. A metal protective housing 30 is fitted over the slot 29 on the outer surface of the back wall 20 to form a receiving pocket for the bulb 28. This housing 30 has converging top and bottom walls (as seen in FIGURES 1 and 2) so that the bulb 28 approaches the apex of the converging walls as the bulb moves into the pocket of the housing. The housing 30 is constructed of a suitable metal such as aluminum which will not corrode at high temperatures and which will conduct heat readily. The back side of the housing includes cooling fins 31 and 32 which extend through the oven insulation 33 and protrude outwardly of a back wall 34 which confines the oven insulation around the oven liner 16. There is an air flue or channel 35 extending up the back of the range that is formed by the back wall 34 and a back cover 36 arranged to have top and bottom air openings so that ambient air may pass up over the cooling fin 32 and maintain the temperature of the protective housing 30 at a relatively low value.

The housing 30 is held to the back side of the oven wall 20 by means of a large thick insulating block 37 of ceramic or the like material of low thermal conductivity having an elongated slot 38 in which the housing is fitted. This elongated slot 38 is comparable in size to the slot 29 in the oven wall 20 so that the block is in effect interposed between the oven liner slot 29 and the housing 30. Flanges 39 are formed on the sides of the housing 30 as is seen in FIGURE 3 so that fastening screws 40 may be used to hold the housing on the block and the block to the outer surface of the oven wall 20.

Two vertically disposed S-shaped spring straps 43 of bimetallic material are used to support the thermostat bulb 28 in the oven cavity, as is best seen in FIGURE 3. One end of each strap is fastened to the inner side of the oven wall 20 adjacent the slot 29 while the opposite end is looped over the thermostat bulb at an offset portion 44 (FIGURE 1) of the bulb. Hence when the bulb is shifted into the protective housing 30, the major length of the bulb will be in actual surface contact with the metal sides of the housing for the better transfer of heat from the bulb to the cooling fins 31 and 32.

As best seen in FIGURES 2 and 3 the capillary tube 27 leads from the bulb 28 and extends through a small opening 47 in the housing 30, through the wall of insulation 43, the back wall 34 and into the air chamber 35. At this point the capillary tube is wound in a loose coil 48 so that no sharp bends exist in the tube which might otherwise cause failure of the tube during repeated flexing.

It will be understood that in the operation of this oven the thermostat bulb when the control knob 26 is set to any temperature within the normal bake temperature range, will operate to control the energization and de-energization of the heater 22 to hold the desired bake temperature, and that as long as the control knob is set for a normal bake operation the thermostat bulb 28 will remain within the oven cavity as shown in FIGURES 1 and 2.

However, when the knob 26 is set to its high temperature cleaning position it will, of course, set the thermostat so that it will attempt to hold the higher set temperature while the bulb is in its normal position of FIGURES 1 and 2. However, when the temperature in the oven rises above 550° F., the maximum temperature of the normal bake range, the bimetallic elements 43 will move the bulb 28 out of the oven cavity and into the housing 30, and as the temperature rises the bulb 28 will be moved into its completely retracted position shown at the right in dotted lines in FIG. 2. As explained previously heat will then be drained away from the bulb so that the temperature of the thermal fluid will not rise appreciably above that which it attains when in the oven with the oven operating at 550° F.–600° F. Stating it differently, while the temperature of the oven will rise to the desired cleaning temperature set by the knob 26 the temperature of the bulb 28 may reach a maximum temperature of 600° F. The thermostat however will function as before so that when the bulb temperature rises slightly above 600° F. for example, which will correspond to an oven cleaning temperature of about 900° F., for example, the heater 22 will be de-energized so that the oven temperature will fall somewhat. When the oven temperature thus falls so that the bulb temperature falls somewhat below 600° F. the heater 22 will be re-energized thereby cycling the thermostat. In this way the thermostat will function to hold the high heat cleaning temperature even though the bulb temperature ranges only around the comparatively lower temperature of 600° F. When the control knob 26 is returned to its "off" position to shut off the heat from the oven the oven of course will cool down and the bimetallic elements 43 eventually will return the bulb 28 to its normal operative position shown in the drawing.

Modifications of this invention will occur to those skilled in this art and it is to be understood, therefore, that this invention is not limited to the particular embodiment disclosed but that it is intended to cover all modifications which are within the true spirit and scope of this invention as claimed.

What I claim as new and desire to secure by Letters Patent of the United States is:

1. A thermostat bulb protector for use with an oven comprising a thermostat that has a fluid-filled bulb mounted in the oven and joined on the end of a capillary tube, a protective housing cooperating with the bulb and adapted to be supported on the outside of the oven, spring means for supporting the bulb at a distance from the housing, said spring means being affected by high temperatures in excess of about 500° F. to automatically shift the bulb out of the oven and into the housing, and cooling means for cooling the housing to protect the bulb from reaching excessive temperatures that might otherwise destroy the bulb and its control fluid.

2. A thermostat bulb protector as recited in claim 1 wherein said spring means is of bimetallic construction which deflects whenever the temperature of the bulb is in excess of about 500° F. so that the bulb acts as a disappearing member when the temperature range is in excess of this temperature in order to protect the bulb and its control fluid from temperature failure.

3. A thermostat bulb protector as recited in claim 2 wherein the said capillary tube is resiliently supported between the bulb and the thermostat so that it does not interfere with the free movement of the bulb into and out of the protective housing.

4. A thermostat bulb protector as recited in claim 3 wherein the protective housing includes a cooling fin means which is adapted to extend into a chamber behind the oven that has a moving column of air so that the heat of the protective housing can be dissipated in the chamber, there being a low thermal conducting material adapted to be interposed between the oven and the protective housing so that the cooling fin means pulls the heat out of the bulb.

5. A range oven comprising an oven liner having a bottom wall, parallel side walls, a top wall, a back wall and an open front that is closed by an oven door, and heating means for raising the temperature of the oven for normal cooking operations ranging up to 550° F. as well as for automatic heat cleaning at temperatures between about 750° F. and 950° F. where food soil is burned off the walls of the oven liner and the inner door surface, a hydraulic thermostat for sensing and controlling the temperature in the oven comprising a bulb formed on the end of a capillary tube that leads from the thermostat, a slot formed in one wall of the oven liner for receiving the thermostat bulb therethrough, a protective housing cooperating with said slot for receiving the bulb as it passes through the slot, and spring means for supporting the thermostat bulb within the oven at a short distance from the slot, said spring means being affected by high temperatures in excess of around 500° F. to automatically shift the bulb through the slot and into the protective housing, and means for cooling the housing so as to protect the bulb from reaching excessive temperatures that might otherwise destroy the bulb and its control fluid.

6. A range oven as recited in claim 5 wherein a protective housing is isolated from the oven liner by a block of low thermal conducting material and is likewise provided with cooling fin means located in the path of ambient air so that the temperature of the housing is substantially lower than the oven temperature at all times.

7. A range oven as recited in claim 6 wherein the said capillary tube is resiliently supported between the thermostat bulb and the thermostat so that the tube is capable of moving simultaneously with the bulb as the bulb disappears into the housing.

8. A thermostatic control system for controlling the heating means for an electric oven comprising a bulb within said oven, a temperature responsive fluid filling said bulb for controlling said heating means responsively to the expansion and contraction of the fluid, and protective means for preventing excessive temperature rise in said fluid including cooling means, and thermal actuating means operated responsively to the temperature of said oven connected to said bulb to move the bulb into cooling relation with said cooling means upon the occurrence of a predetermined high temperature in said oven.

References Cited in the file of this patent

UNITED STATES PATENTS

| | | |
|---|---|---|
| 2,254,687 | Koci | Sept. 2, 1941 |
| 2,271,485 | Koci | Jan. 27, 1942 |
| 2,279,064 | Rutenber | Apr. 7, 1942 |